United States Patent
Rossow et al.

(10) Patent No.: US 6,493,616 B1
(45) Date of Patent: Dec. 10, 2002

(54) DIAGNOSTIC AND CONTROL UNIT FOR POWER MACHINE

(75) Inventors: Scott R. Rossow, Kindred, ND (US); Kenneth A. Brandt, Wyndmere, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/374,060

(22) Filed: Aug. 13, 1999

(51) Int. Cl.$^7$ ............................. F02N 11/08; F02D 9/00
(52) U.S. Cl. ............................. 701/29; 701/36; 37/414
(58) Field of Search ............................. 701/29, 30, 33, 701/35, 50, 36, 2, 110, 115, 113; 707/203; 712/37; 37/414; 172/8, 9, 4.5; 123/179.3, 179.2; 341/176

(56) References Cited

U.S. PATENT DOCUMENTS

| | | | |
|---|---|---|---|
| 4,236,594 A | * 12/1980 | Ramsperger | 180/167 |
| 4,751,633 A | * 6/1988 | Henn et al. | 364/200 |
| 4,853,946 A | 8/1989 | Elliott et al. | 378/4 |
| 4,893,240 A | * 1/1990 | Karkouti | 364/424.05 |
| 5,056,026 A | 10/1991 | Mitchell et al. | 364/431.03 |
| 5,252,812 A | * 10/1993 | Nakamura | 235/380 |
| 5,278,759 A | * 1/1994 | Berra et al. | 364/424.01 |
| 5,315,515 A | * 5/1994 | Schmitz | 364/424.01 |
| 5,394,327 A | 2/1995 | Simon, Jr. et al. | 364/424.01 |
| 5,425,431 A | * 6/1995 | Brandt et al. | 180/273 |
| 5,453,939 A | 9/1995 | Hoffman et al. | 364/551.01 |
| 5,521,588 A | 5/1996 | Kuhner et al. | 340/825.22 |
| 5,526,269 A | * 6/1996 | Ishibashi et al. | 364/424.03 |
| 5,551,518 A | 9/1996 | Stratton | 172/4.5 |
| 5,579,227 A | 11/1996 | Simmons, Jr. et al. | 364/424.03 |
| 5,586,057 A | 12/1996 | Patel | 364/551.01 |
| 5,680,099 A | 10/1997 | Springston | 340/461 |
| 5,687,081 A | 11/1997 | Wellman et al. | 364/424.07 |
| 5,769,051 A | * 6/1998 | Bayron et al. | 123/335 |
| 5,802,485 A | * 9/1998 | Koelle et al. | 701/29 |
| 5,826,205 A | * 10/1998 | Koelle et al. | 701/29 |
| 5,908,454 A | * 6/1999 | Zyburt et al. | 701/24 |
| 6,041,333 A | * 3/2000 | Bretschneider et al. | 707/203 |
| 6,112,139 A | * 6/2000 | Schubert et al. | 701/2 |
| 6,175,784 B1 | * 1/2001 | Jicha et al. | 701/19 |
| 6,249,727 B1 | * 6/2001 | Muller | 701/36 |

FOREIGN PATENT DOCUMENTS

| | | |
|---|---|---|
| DE | 197 36 231 A1 | 2/1999 |
| EP | 0 549 541 A1 | 12/1992 |
| EP | 0 762 249 A1 | 7/1996 |
| GB | 2 279 774 A | 9/1994 |
| WO | WO 91/04938 | 4/1991 |

* cited by examiner

Primary Examiner—Tan Nguyen
Assistant Examiner—Dalena Tran
(74) Attorney, Agent, or Firm—Joseph R. Kelly; Westman, Champlin & Kelly, P.A.

(57) ABSTRACT

A diagnostic and control unit allows a field technician to unlock and monitor the operation of a power machine, perform diagnostics on the power machine or modify the operating parameters of the power machine without bringing the power machine to a service station or back to the factory. The diagnostic and control unit illustratively includes a remote start and control interface, and a controller. The remote start and control interface receives inputs for unlocking the operation of one or more the hydraulic functions on the power machine.

30 Claims, 11 Drawing Sheets

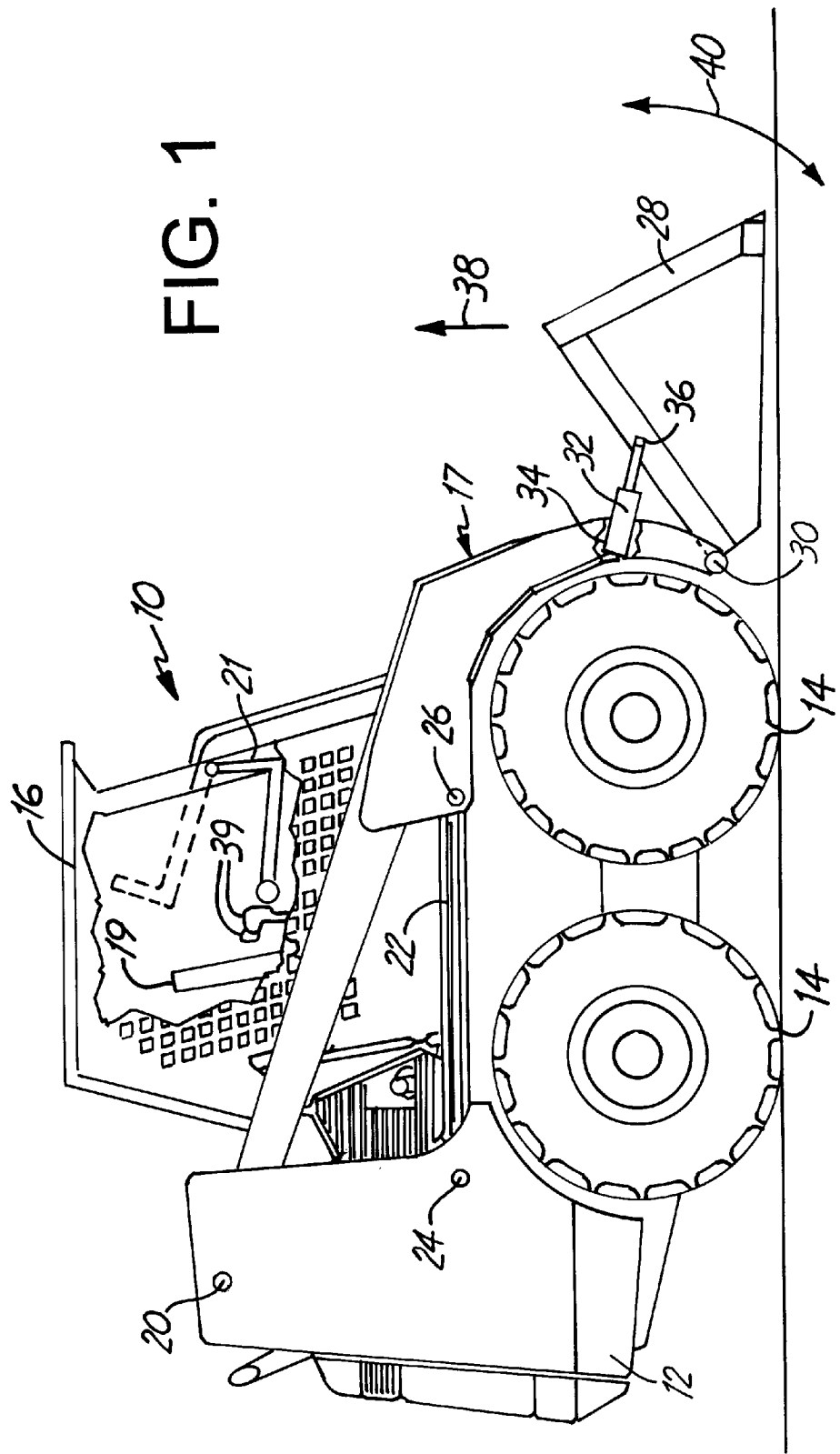

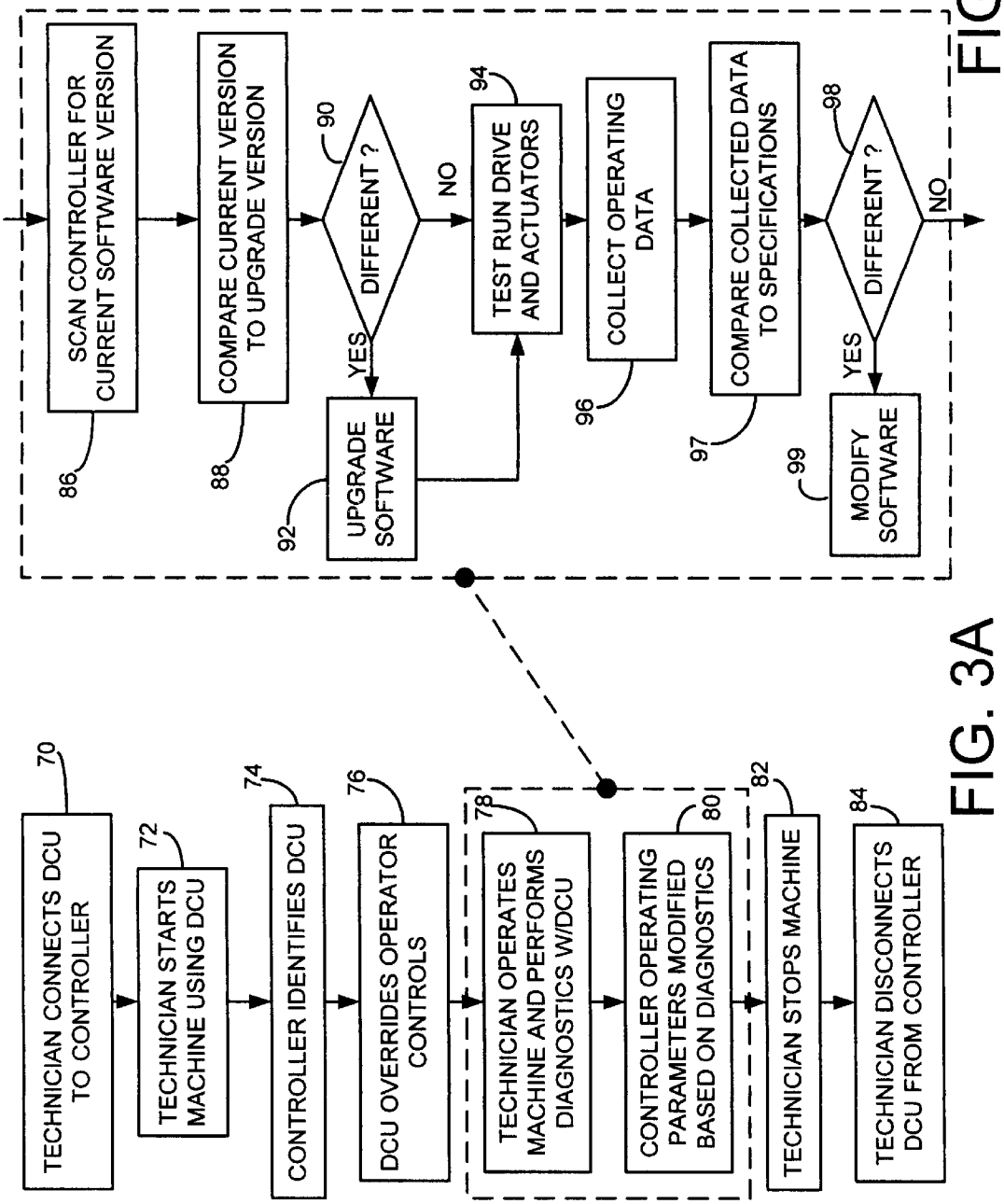

FIG. 5

Service Analyzer 1.1 - [Calibration]

- Calibration
- Monitoring
- Diagnostics

Print Machine Description

Adv. Settings

Machine Information

Product Number: 518255555
Hourmeter: 0.2
Options Code: 51

Options/Kits Equipped
- ☑ Front Auxiliary
- ☑ High Flow
- ☑ Rear Auxiliary
- ☐ Bucket Positiong
- ☐ Two Speed
- ☐ Shutdown Protection
- ☑ Auto Update Bobcat Controller ✓ Send    ⟲ Reset

| | |
|---|---|
| Machine Serial Number | 518255555 |
| Machine Model Number | 751G |
| Machine Option Code | 51 |
| Programmed Hours | 0.0 |
| Controller ROM Section | 1 |
| Controller Operational Code | 104 |
| Flywheel Teeth | 6718415-7, 6718416-8, 6718417-9 |
| Fuel Sender | 6674209 |
| Engine Coolant Temperature | 6718417 |
| Hydraulic Temperature | 6674315 |
| Engine Oil Pressure | 6674316 |
| Hydraulic Charge Pressure | 0F 20F 40F 70F |
| Glow Plug Temperatures | 30s 20s 10s 0s |
| Glow Plug Preheat Time | 5s 5s 5s 5s |
| Glow Plug Preheat Wait Time | 10s 10s 10s 10s |
| After Glow Time | 5s 5s 5s 5s |

- Options
- Help
- Exit

COM1    done

| | | |
|---|---|---|
| $70058-S70059 Engine Coolant Temperature Cold | = | 6E |
| $7005A-S7005B Engine Coolant Temperature High | = | 10E |
| $7005C-S7005D Engine Coolant Temperature Very High | = | 113 |
| $70072-S70073 Hydraulic Oil Temperature Cold | = | 8C |
| $70074-S70075 Hydraulic Oil Temperature High | = | 10E |
| $70076-S70077 Hydraulic Oil Temperature Very High | = | 113 |
| $700BE-S700BF Engine Speed Running | = | 2BC |
| $700C0-S700C1 Engine Speed Stopped | = | 64 |
| $700C2-S700C3 Engine Speed High | = | DAC |
| $700C4-S700C5 Engine Speed Very High | = | FAO |
| $700C6-S700C7 Engine Speed No Signal | = | O |

FIG. 6

DIAGNOSTIC AND CONTROL UNIT FOR POWER MACHINE

INCORPORATION BY REFERENCE OF CO-PENDING APPLICATION

The following U.S. patent applications are hereby fully incorporated by reference:

Application Ser. No. 09/298,671, filed Apr. 23, 1999, entitled "FEATURES OF MAIN CONTROL COMPUTER FOR A POWER MACHINE"; and Application Ser. No. 29/103,252, filed Apr. 12, 1999, entitled "DISPLAY PANEL FOR POWER MACHINE";

Application Ser. No. 29/103,267, filed Apr. 12, 1999, entitled "DISPLAY PANEL FOR POWER MACHINE";

Application Ser. No. 29/103,256, filed Apr. 12, 1999, entitled "DISPLAY PANEL FOR POWER MACHINE"; and Application Ser. No. 09/326,108, filed Jun. 4, 1999, entitled "USER INTERFACE FUNCTIONALITY FOR POWER MACHINE CONTROL SYSTEM, all of which are assigned to the same assignee as the present invention.

BACKGROUND OF THE INVENTION

The present invention generally relates to power machines. More specifically, the present invention relates to a diagnostic unit (or service tool) for use with a power machine.

Power machines, such as skid steer loaders, typically have a frame which supports a cab and a movable lift arm which, in turn, supports a work tool such as a bucket. The movable lift arm is pivotally coupled to the frame of the skid steer loader by power actuators which are commonly hydraulic cylinders. In addition, the tool is coupled to the lift arm by another power actuator which is also commonly a hydraulic cylinder. An operator manipulating the skid steer loader raises and lowers the lift arm, and manipulates the tool, by actuating the hydraulic cylinders coupled to the lift arm, and the hydraulic cylinder coupled to the tool. When the operator causes the hydraulic cylinders coupled to the lift arm to increase in length, the lift arm moves generally vertically upward. Conversely, when the operator causes the hydraulic cylinders coupled to the lift arm to decrease in length, the lift arm moves generally vertically downward. Similarly, the operator can manipulate the tool (e.g., tilt the bucket) by controlling the hydraulic cylinder coupled to the lift arm and the working tool to increase or decrease in length, as desired.

Skid steer loaders also commonly have an engine which drives a hydraulic pump to, in turn, power hydraulic traction motors which power movement of the skid steer loader. The traction motors are commonly coupled to the wheels through a drive mechanism such as a chain drive.

Typically, the hydraulic circuits that serve the lift arm, the tool and the traction mechanism are controlled by mechanical linkages to levers, pedals, and/or handgrips, all of which can be manipulated by an operator. More recently, the hydraulic circuits controlling the lift and tilt functions (e.g., the lift arm and tool) are controlled by an electronic controller as a function of inputs from an operator interface. The controller serves to control the flow of hydraulic fluid in the hydraulic circuits as a function of the operator inputs. The controller is typically a microprocessor capable of being programmed to correlate the operator input (which is an electrical signal generated by an input mechanism such as from a switch, trigger, handgrip, or button) to the controller output. The controller output is an electrical signal provided, for example, to an electrically controlled solenoid or valve spool, to control hydraulic fluid flow through a valve associated with the solenoid or valve spool. Thus, the hydraulic circuits which control the lift arm and the tool (and possibly auxiliary or other couplers) operate as a function of the output of the controller. Accordingly, control of the various hydraulic implements on the power machine is a function of the operator input as defined by the software associated with the controller. The software loaded on the controller typically includes a set of operating parameters that are predetermined at the factory and loaded onto the controller.

If, after the power machine has left the factory and is used in the field, it is necessary or desirable to alter the performance of the power machine by, for example, adding an implement or attachment to the machine or change operational characteristics of the machine, it may be necessary to modify the software on the controller to change or improve performance of the reconfigured power machine. In addition, after a power machine has been in use for a period of time, it may be necessary or desirable to modify the software on the controller in order to recalibrate certain parameters or upgrade the software to a more current version. In particular, it may be desirable to upgrade the software to improve performance of the power machine and/or make it suitable for use with newly available attachments. To accommodate this reprogramming, it has been necessary with prior art power machines to completely replace components (such as the controller or memory associated therewith, or both). This can be costly and inefficient.

Similarly, testing or monitoring operation of a power machine, or diagnosing a problem on a power machine, can be difficult. For instance, when the power machine is of the type in which the hydraulic circuit is controlled by an electronic controller, performing diagnostics on such a system can be fairly complicated and time consuming.

SUMMARY OF THE INVENTION

The present invention provides a service tool for use with a power machine such as a skid steer loader. The service tool allows a field technician to do one or more of the following: monitor operation of the power machine, control the operation of the power machine, perform diagnostics on the power machine and/or modify the operating parameters of the power machine without replacing components. The ability to perform diagnostics in the field results in substantial cost and time savings. The ability to control and monitor the power machine during diagnostics allows the technician to test the machine's performance and modify the operating parameters of the machine, if necessary.

In an illustrative embodiment of the present invention, the service tool is designed for use with a power machine which includes a hydraulic drive circuit connected to a hydraulic drive motor, a hydraulic actuator circuit connected to a hydraulic actuator, and a controller connected to the hydraulic drive circuit and the hydraulic actuator circuit. The controller has an input, an output and a set of operating parameters which correlate the input to the output. At least one of the hydraulic functions of the power machine operate as a function of the output of the controller. An operator interface unit provides operator actuable inputs, is connected to the controller, and has an output which is a function of an operator interface input. The output of the operator interface unit provides the input to the controller such that the operator interface input controls the operation of the designated hydraulic function.

The service tool illustratively includes a remote start and control device and a computer. The remote start and control device controls the operation of an engine on the power machine and at least one hydraulic function. The diagnostic and control unit includes an interface for interfacing with the controller.

The remote start and control device illustratively includes an unlock input for unlocking the operator controls, a starter input for starting and stopping the power machine, and hydraulic control inputs for controlling or unlocking one or more of the hydraulic functions. The computer illustratively also includes a diagnostic mechanism for scanning the controller, for detecting the operating parameters of the controller, for collecting performance data of the power machine and/or for modifying the operating parameters of the controller.

Another illustrative embodiment of the present invention is a method of controlling, diagnosing and modifying the operation of a power machine using a diagnostic and control unit that includes a remote start and control device connected to a computer. The method illustratively includes the steps of connecting the diagnostic and control unit to the controller on the power machine, unlocking and operating a hydraulic function on the power machine, performing diagnostics on the power machine using the computer and modifying the operating parameters of the controller based on the diagnostics.

The diagnostic method illustratively includes the steps of scanning the controller for (or receiving an input indicative of) a current installed software version, comparing the current software version with an upgrade version, and automatically upgrading the installed software if the current version is different from the upgrade version. The software illustratively includes operating parameters. The diagnostic method may also include the steps of collecting operating performance data as at least one of the hydraulic functions are operated, comparing the data to desired performance specifications and modifying the operating parameters of the controller if the collected data is different from the desired or specified data.

BRIEF DESCRIPTION OF THE DRAWINGS

FIG. 1 is a side elevation view of a skid steer loader in accordance with one embodiment of the present invention.

FIGS. 3A and 3B are flow charts illustrating the operation of the diagnostic and control unit in accordance with one embodiment of the present invention.

FIG. 5 is one illustration of a user interface in accordance with one embodiment of the present invention.

FIG. 6 illustrates a table and information stored in memory and indicating but a few exemplary programmable operating parameters in accordance with one embodiment of the present invention.

DETAILED DESCRIPTION OF THE ILLUSTRATIVE EMBODIMENTS

Figure 2A:
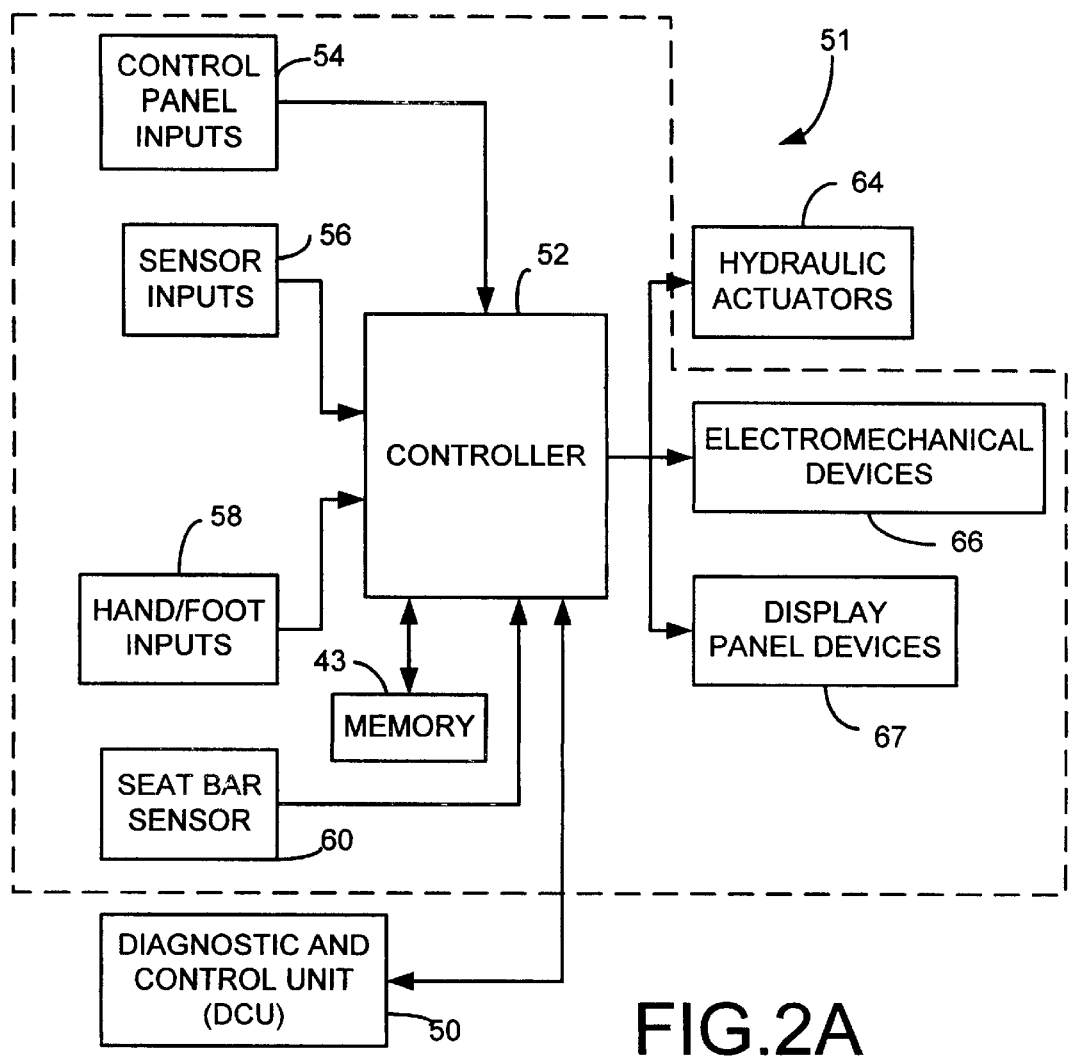
FIG. 2A is a block diagram of a control system for a power machine.

The present description proceeds with respect to a loader described below. However, it should be noted that the present invention can be implemented in other power machines, such as mini-excavators, as well. The present invention is described with respect to the loader for illustrative purposes only.

FIG. 1 is a side elevational view of a skid steer loader 10 of the present invention. Skid steer loader 10 includes a frame 12 supported by wheels 14. Frame 12 also supports a cab 16 which defines an operator compartment and which substantially encloses a seat 19 on which an operator sits to control skid steer loader 10. Cab 16 can take any shape desired and is illustrated with the shape shown for exemplary purposes only. A seat bar 21 is pivotally coupled to a portion of cab 16. When the operator occupies seat 19, the operator then pivots seat bar 21 from the raised position (shown in phantom in FIG. 1) to the lowered position shown in FIG. 1. It should also be noted that seat bar 21 can be a rear pivot seat bar or can take substantially any other form.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is also coupled to a working tool which, in this preferred embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only one cylinder 32 is shown, it is to be understood that any desired number of cylinders or other actuators could be used to work bucket 28 or any other suitable tool.

The operator residing in cab 16 can manipulate lift arm 17 and bucket 28 by selectively actuating hydraulic cylinders 22 and 32. By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22 causing it to decrease in length, bucket 28 moves generally vertically downward to the position shown in FIG. 1.

The operator can also manipulate bucket 28 by actuating cylinder 32. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

FIG. 1 also illustrates a plurality of hand controls, or hand grips 39 which reside within the operator compartment 16. Hand grips 39 preferably are provided with a number of actuators (such as push buttons, potentiometers, switches, etc.) which can be manipulated by the operator to accomplish certain functions. The operator-actuable inputs on hand grips 39 in one illustrative embodiment provide electrical signals to a control computer (described in greater detail later in the specification) which controls certain functions of loader 10 in response to the signals received.

In addition, in one illustrative embodiment, one or more operator input and display panels (shown in FIG. 2) are provided in operator compartment 16. The operator input display panels provide a display for indicating certain items of information to the operator, and can also provide additional operator input devices, such as a membrane keypad, a touch sensitive screen, etc., through which the operator can provide inputs.

It should, however, be noted that inputs can be provided in a mechanical way as well. For instance, hand grips 38 can be coupled to levers which control valve spools or solenoids through mechanical linkages. Similarly, foot pedals can be provided in operator compartment 16 which also control valve spools or solenoids through mechanical linkages.

In addition, loader 10 illustratively has one or more auxiliary hydraulic couplings (not shown in FIG. 1) which can be provided with quick disconnect or other type fittings. Hydraulic pressure to the auxiliary couplings can also be controlled based on signals from one or more of the operator input devices within operator compartment 16.

FIG. 2A is a block diagram of one embodiment of a control system 51. System 51 includes controller 52, control panel inputs 54, sensor inputs 56, hand/foot inputs 58, sensor 60, hydraulic actuators 64, electromechanical solenoids 66, and display panel devices 67. Controller 52 is illustratively a digital computer, microprocessor, or microcontroller with associated memory 43 which can be integrated with controller 52 or provided separately. Controller 52 also includes appropriate timing circuitry. It should also be noted that controller 52 can be implemented as a plurality of connected computers, microprocessors or microcontrollers. In such a distributed embodiment, the controllers can each be assigned different tasks, or can all work on the same tasks, as desired.

Control panel inputs 54 can include a wide variety of operator input devices (such as buttons, a keypad, etc.) used to control such features as headlights, interlock systems, ignition, the user interface, etc. This information can be transmitted to controller 52 via direct digital inputs, a one-way serial stream or any number of bi-directional serial communication protocols. Similarly, the connection between control panel inputs 54 and controller 52 illustratively includes power and ground connections as well.

Sensor inputs 56 can also include a wide variety of analog or digital sensors or frequency inputs indicative of operating conditions or other sensed items, such as engine oil pressure sensor, fuel sensor, engine cooling sensor, air filter sensor (which indicates reduced air flow—thus indicating a clogged air filter), engine speed sensor, a hydraulic oil temperature sensor, a hydraulic oil charge pressure sensor, and/or a hydraulic oil filter pressure switch, etc.

Hand grip and foot pedal inputs 58 can also include a variety of input devices which form the operator actuable inputs within operator compartment 16. Such inputs can provide signals indicative of requested operation of the auxiliary hydraulic couplers (e.g., modulated control), requested detent, requested high speed or low speed operation in a multi-speed loader, and other requested functions (such as lift and tilt of the tool mounted to the loader, etc.).

Seat bar sensor 60 is illustratively coupled to seat bar 21. Seat bar sensor 60 illustratively provides a signal indicative of whether seat bar 21 is in the raised or lowered position illustrated in FIG. 1.

Hydraulic actuators 64 illustratively include the lift and tilt cylinders for use in manipulating tool 28 (shown in FIG. 1), a high flow valve for emitting high flow hydraulic fluid in response to a user input, a diverter valve for diverting hydraulic fluid to the auxiliary couplers in response to a user input, auxiliary relief valves, and a plurality of lockout valves for being actuated in response to operator inputs, or in response to certain sensed operating parameters. Of course, the hydraulic actuators are controlled by manipulating valve spools of valves connected between the specific actuator being controlled and a source of, or reservoir for, hydraulic fluid. Such valves include one or more primary valves controlling flow to primary hydraulic couplers and optionally one or more auxiliary valves for controlling flow to auxiliary hydraulic couplers. The valves can be controlled, for example, electronically, hydraulically, electromechanically or mechanically. Block 64 represents all of these elements.

Electromechanical devices 66 also include a wide variety of items. Some items are embodied as electrical relays which are controlled by energizing an electrical relay coil. Such electromechanical devices illustratively include a starter relay for energizing a starter, a switched power relay for providing battery power for switched power devices, a fuel shut-off relay for energizing a fuel shut-off valve, a traction lock relay for energizing a traction lock solenoid, a glow plug relay for energizing glow plugs, and light relays for controlling various lights (such as headlights, marker lights, etc.).

Display panel devices 67 are illustratively devices which receive outputs from controller 52 (and illustratively through a user interface controller such as that shown in the above-referenced co-pending application) and indicate information to the operator. Such devices can include, for example, indicator lights, an hour meter, actual or virtual gauges, a display screen, a CRT, a plasma display, LEDs, an LCD display, etc. Display panel devices 67 can be integrated with control panel inputs 54 as a unitary input and display panel or provided separately therefrom.

Controller 52 can also implement lockout functions. These functions can be used to lock out certain functions under certain circumstances. The lockout functions can also be used to maintain certain functions (e.g., traction, lift, tilt, etc.) in a locked out state unless certain operating conditions are present (e.g., controller 52 has received a suitable user password).

In operation, controller 52 receives a variety of inputs from the control panel inputs 54, the sensor inputs 56, the hand and foot actuable inputs 58, and seat bar sensor 60. In response to those inputs, controller 54 provides outputs to hydraulic actuators 64 electromechanical devices 66 and display panel devices 67 to control various functions on loader 10.

Controller 52 is illustratively a programmable microprocessor utilizing software which includes operating parameters. The software and operating parameters are stored in memory 43 which includes random access memory (RAM) and read only memory (ROM), and which can include different or other types of memory as well. The operating parameters are stored in memory 43 for execution by controller 52 along with control algorithms which are used to provide the outputs to the various components coupled to controller 52 based on the inputs to controller 52. It may be desirable to modify the operating parameters or control algorithms used by controller 52 to change the response of controller 52 to various inputs. This may be desirable, for example, if the power machine is modified to accommodate different attachments, if certain component values within power machine 10 have drifted such that recalibration is desired, or if upgraded control algorithms have been developed such that a general software upgrade is desired.

The software and operating parameters in memory 43 may be loaded into memory 43 when power machine 10 is manufactured at the manufacturing facility. In that case, it would be undesirable if the operating parameters and control algorithms could only be modified by replacing components on power machine 10. Thus, FIG. 2A also shows control system 51 coupled to a diagnostic and control (DCU) 50. DCU 50 of the present invention eliminates the need to replace components in power machine 10 in order to change operating characteristics of the power machine.

In particular, DCU 50 in accordance with one embodiment of the present invention allows a field technician to couple DCU 50 to controller 52 by a suitable link (such as a direct mechanical cable link, an infrared link, an ultrasonic link or other wireless link) using any suitable desired communication protocol (such as RS232). Once DCU 50 is coupled to controller 52, the field technician can upgrade the software in memory 43, monitor operation of power machine 10, perform diagnostics on power machine 10, modify the operating parameters stored in memory 43 either directly or as a function of the diagnostics, and physically start and control certain functions of loader 10 without ever entering cab 16.

Figure 2B:
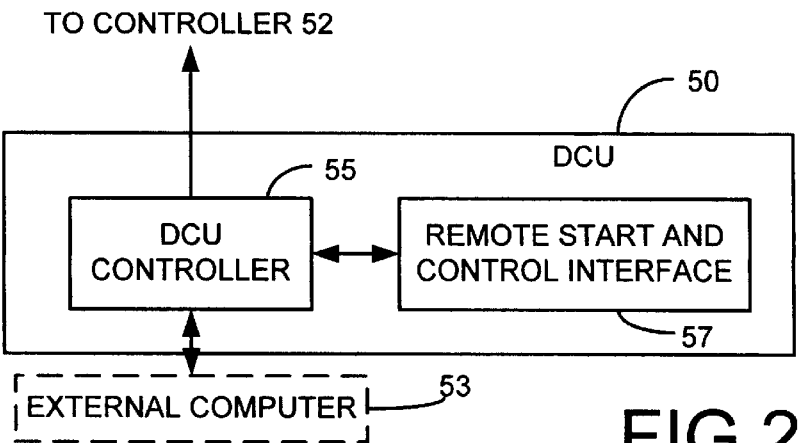
FIG. 2B is a block diagram of a diagnostic and control unit in accordance with one embodiment of the present invention.

FIG. 2B is a more detailed block diagram of DCU 50 shown attached to an optional external computer 53. DCU 50 has two primary components including DCU controller 55 and remote start and control interface 57. DCU controller 55 is illustratively a digital computer, a microprocessor, a microcontroller, or other suitable control device with associated timing circuitry and memory. Remote start and control interface 57 provides a number of user input mechanisms which receive user inputs and provide signals to DCU controller 55 based upon the user inputs. Remote start and control interface 57 is illustrated in greater detail with respect to FIGS. 4A and 4B (discussed below). External computer 53 is illustratively a conventional personal computer, but can also be implemented in other configurations, such as a lap top computer, a hand-held or palm top computer, etc.

DCU controller 55 is illustratively coupled to controller 52 by a controller area network (CAN). In one illustrative embodiment, the point at which DCU 50 is connected to controller 52 is the point at which another attachment control module could otherwise be attached. The connection mechanism is illustratively a standard seven pin cable harness.

FIGS. 3A and 3B are flow diagrams illustrating one embodiment of how a field technician can upgrade software or change operating parameters in memory 43, in general. Initially, the field technician connects DCU 50 to controller 52 by way of the CAN. This is indicated by block 70. Once DCU 50 is connected to controller 52, the field technician may then start power machine 10 by providing appropriate inputs using the remote start and control interface 57 on DCU 50. This is indicated by block 72.

After starting power machine 10, controller 52 recognizes that it is connected to DCU 50. This can be done in any suitable way, such as by having controller 52 poll its inputs, or by having DCU controller 55 provide a predetermined, recognizable input to controller 52, for instance. This is indicated by block 74.

Once DCU 50 is identified, the inputs from remote start and control interface 57 act to unlock functions controlled by the hand/foot inputs 58 and take the place of some or all control panel inputs 54. In this manner, the remote start and control interface 57 may be used to control various aspects of operation of power machine 10. This is indicated by block 76. The technician can then modify or update software or operating parameters in the controller 52 or memory 43. This can be done automatically in response to the DCU 50 determining that the software on machine 10 is not the current version, it can be done by manually actuating a data transfer between DCU 50 and controller 52, or in response to the diagnostics, etc.

For instance, once the field technician has gained control of power machine 10, the technician can then exercise or unlock certain hydraulic functions (such as auxiliary hydraulics, etc.) or other functions associated with controller 52. While the technician is exercising power machine 10, DCU controller 55 or external computer 53 performs diagnostics on power machine 10. This is indicated by block 78. Based on the diagnostics run by the technician, the software, the operating parameters, or both can be modified. This is indicated by block 80.

Once the diagnostics are complete and the necessary software upgrades and operating parameter modifications have been performed, the field technician then stops machine 10, as indicated by block 82, using the remote start and control interface 57. The field technician then disconnects DCU 50 from controller 52 and power machine 10 is again ready for use by the operator. This is indicated by block 84.

The diagnostics, modifications and upgrades performed by DCU 50 maybe implemented in any number of ways. An example of a suitable method for performing a software upgrade is illustrated in the flow diagram set out in FIG. 3B. In this exemplary method, computer 53 or DCU controller 55 automatically requests from controller 52, upon establishing communication with controller 52, an indication (or receives some other indication from system 51) of the current version of software installed. This is indicated by block 86. Computer 53 or DCU controller 55 then compares the current version of the software installed to the current version available from the manufacturing facility or service organization, namely the upgrade version. If the current version installed on machine 10 is different from the upgrade version, the software in memory 43 is automatically upgraded by computer 53 or controller 52 transferring the upgraded software from DCU 50 or computer 53. This is indicated by blocks 88, 90 and 92.

It should be noted, however, that the same type of upgrade or modification can be performed with operating parameters stored in memory 43. For example, once the current version of software is stored on loader 10, the field technician can test run the drive mechanisms and hydraulic actuators, and perform any other desired functions on loader 10 or through DCU 50. This is indicated by block 94. DCU 50 collects operating data indicative of the operating conditions or performance of the various functions being performed by loader 10, as is discussed in greater detail below. This is indicated by block 96. The collected data is then compared to predetermined data (such as an operating specification) to determine whether the collected data is within a predetermined range of the expected or specified data. This is indicated by block 97. If the collected data is outside the predetermined range, and modifications are necessary, appropriate operating parameters stored in memory 43 are identified and modified accordingly. This is indicated by blocks 98 and 99.

It should also be noted, however, that the field technician need not modify the software or operating parameters specifically based on diagnostic feedback from loader 10. In other words, an operator of loader 10 may simply notice that certain functions are not working well, or that performance of loader 10 has somehow degraded. That information can be conveyed to a service organization or service facility through any suitable means. The service organization may conclude that certain operating parameters need to be changed. In that case, a custom table of values or parameters is generated remotely and loaded into memory 43 using DCU controller 55 or external computer 53. In other words, DCU 50 can be coupled to a network by either hard wiring or by a wireless connection. The customized table of values or parameters can be loaded onto DCU 50 over the network. DCU 50 can then be used to load the customized table of values or parameters into memory 43. Software upgrades can be performed in the same way.

Figure 4A:
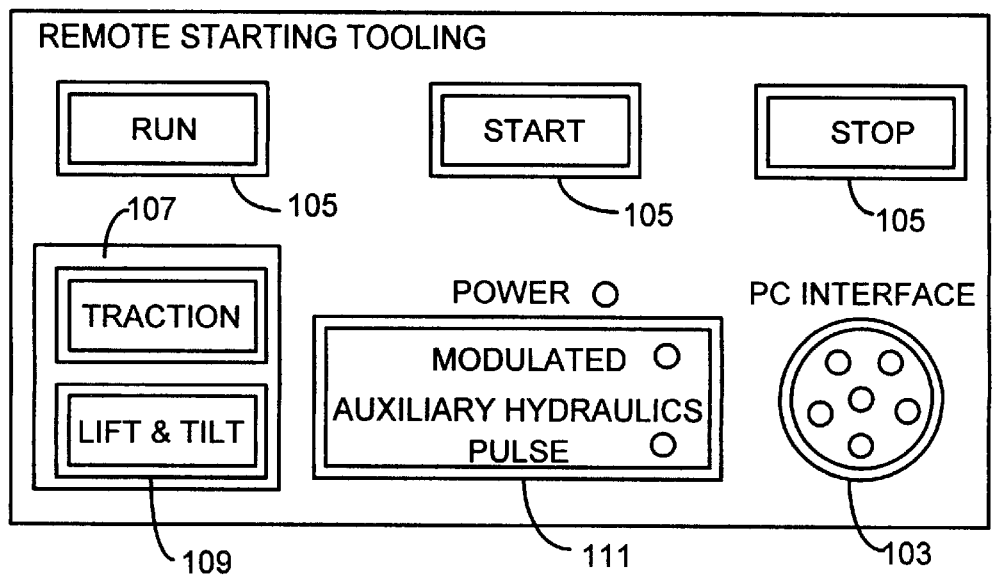
FIGS. 4A and 4B are illustrations of the front and back views, respectfully, of one embodiment of a remote start and control interface of the present invention.
Figure 4B:
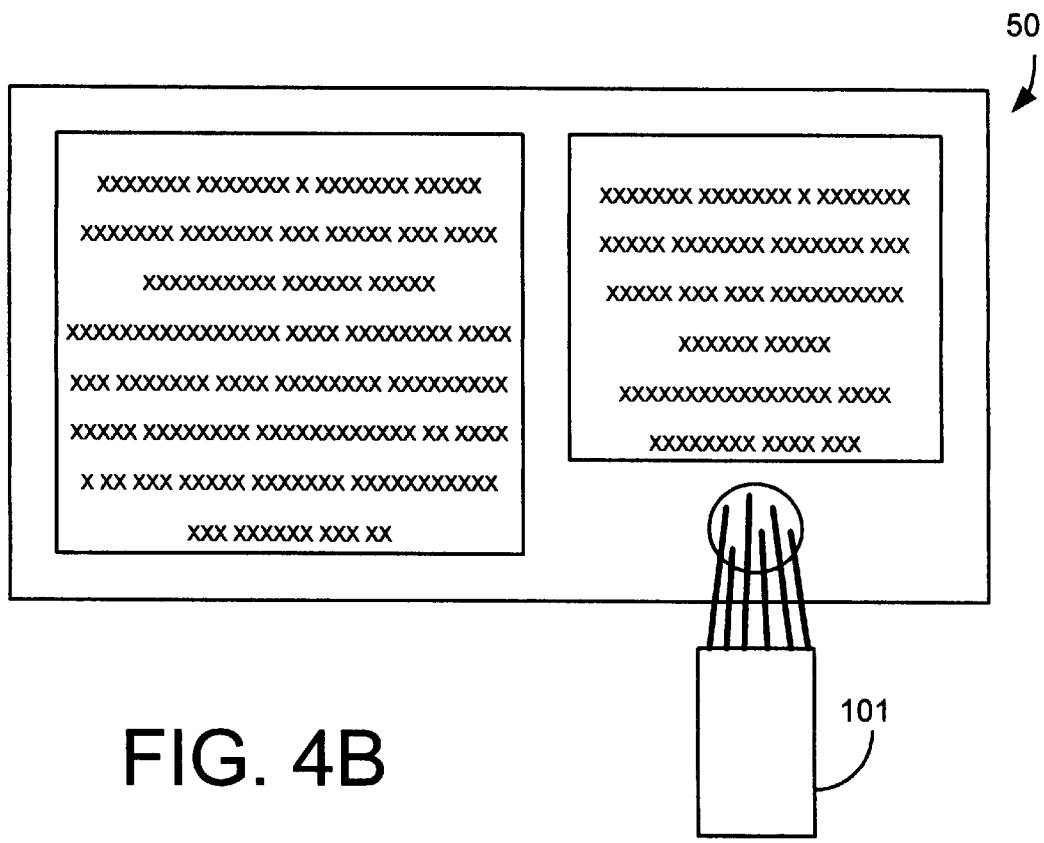

FIGS. 4A and 4B illustrate front and rear views, respectively, of one embodiment of DCU 50. DCU 50 includes a connector mechanism 101 for connection to controller 52 by way of the CAN. The connector mechanism 101 is illustratively in the form of a seven-pin harness with a connector that may be plugged into a socket on power machine 10 that would otherwise be used for an attachment control module. DCU 50 also includes an interface 103 for connection to external computer 53. The interface 103 illustratively includes a four pin or six-pin or other socket which accepts a suitable plug and cable connected to an input/output (I/O) port of computer 53. Alternatively, interface 103 may comprise an infrared or RF based or other desired communication system. DCU 50 also includes a module for implementing a standard communication protocol, such as RS232, with computer 53.

DCU 50 further includes a series of control inputs 105 (which comprise a part of the remote start and control interface 57) which are used for starting, stopping and running the engine of power machine 10. A traction control input 107 is provided on DCU 50 to unlock the hydraulic drive motors driving wheels 14. Similarly, a lift and tilt control input 109 can be provided to unlock the lift and tilt cylinders for ease of manufacturing and testing. In this manner, power machine 10 may be started utilizing DCU 50 and the various hydraulic drive motors and actuators, and other functions, can be unlocked through remote start and control interface 57 so that they may be exercised.

DCU 50 also includes an auxiliary hydraulics control input 111 for switching between on/off operation and pulse width modulated (e.g. proportional control) operation of the auxiliary hydraulics. Those skilled in the art will recognize that controls 105, 107, 109 and 111 may be in any suitable form including keyboard or keypad switches, levers, dials, push buttons, toggle switches, or any other desired input component. Those skilled in the art will also recognize that control inputs 105, 107, 109 and 111 on DCU 50 may be replaced with suitable alternatives or augmented with additional inputs, capable of unlocking the various functions performed by power machine 10. Further, it will be understood that start and control interface 57 can include an additional or different display mechanism such as a display screen or touch sensitive screen as well or substantially different packaging as well.

In an illustrative embodiment, the control inputs on DCU 50 unlock the functions controlled by the operator controls such as the hand/foot inputs 58 and/or control panel inputs 54. With this arrangement, much or all of the operation of power machine 10 may be unlocked (and some controlled) from DCU 50. Thus, DCU 50 permits the field technician to exercise substantially any desired functions on power machine 10 and also allows DCU controller 55 or external computer 53 to perform diagnostics on the power machine 10.

FIG. 5 illustrates a user interface 200 which can be displayed on the display associated with external computer 53 or on a display associated with DCU 50. This discussion will proceed with respect to a display associated with external computer 53 only, for the sake of brevity. User interface 200 illustrates an initialization or calibration screen which is indicative of an initialization or calibration process used by the technician in using DCU5O. In one illustrative embodiment, the technician (or operator) enters the serial number of loader 10 either through a keyboard, or by using a bar code reader or other suitable input device which provides the serial number to computer 53. Computer 53 can then, using a look-up table, obtain the various options which are present on the controller having the designated serial number. The options are illustrated in the upper right hand corner of user interface 200.

Alternatively, an options code can be manually entered by a keyboard, bar code reader, or other desirable input device, in the options code field illustrated on user interface 200. Similarly, the number of hours on an hour meter associated with the given power machine 10 can either be read by computer 52 (through DCU 50) or can be entered manually in the appropriate field.

It can also be seen that the technician can select an option which automatically updates the software in memory 43. This option can be seen at the bottom of the options column on the upper right hand corner of the interface 200.

On the lower half of user interface 200, computer 53 displays certain initialization information, such as the machine serial number, the model number and option code, passwords, and various other physical or electrical attributes of the machine to which computer 53 is connected. Some of these attributes are illustrated in FIG. 5 as examples.

A number of function keys are provided on the left hand side of the user interface 200. The function keys allow the user to switch between the calibration or initialization process illustrated in FIG. 5, a monitoring process, and a diagnostics process. The user can navigate among these various features simply by using a suitable interface device, such as a point and click device (i.e., a mouse).

FIG. 6 is a depiction of an exemplary table which is stored in memory 43 and which can be used to hold operating parameters for use in operating power machine 10. FIG. 6 has a number of columns including a far left hand column which includes the starting address for the value stored, the description of the value contained in the table, and the value in the table.

The illustration in FIG. 6 shows that memory 43 includes a variety of operating parameters and tables containing operating parameters. For example, memory 43 includes an indication of desired oil pressure and temperature, hydraulic pressure, hydraulic temperature, engine speed and battery levels, etc. FIG. 6 also illustrates that memory 43 can include, for example, a range of hydraulic oil temperature which is normal. Anything above that range may invoke, for example, a warning condition or shutdown condition which is illustrated on a suitable display. Other tables can include an engine temperature table, master/owner passwords, tables which indicate a correlation between the degree of rotation of a potentiometer and the desired output, wait time periods for various functions (such as glow plug, preheat, etc.) and a correlation between a pulse width modulated input and a desired output for controlling hydraulic valves in a proportional fashion. Of course, it will be appreciated that a wide variety of other tables and operating parameters can be stored and shown as well. Those illustrated in FIG. 6 are provided for exemplary purposes only.

Memory 43 can also store a read only memory (ROM) table or data base (not shown). The ROM table can include a number of items of information which show, for example, the particular data and number of bytes associated with each particular function or parameter stored in the data base, as well as whether a timer is used with the parameter and the frequency with which the timer is incremented or decremented, or any other parameter, along with the address in the read only memory at which the particular parameter is located. A wide variety of parameters can be stored.

Figures 7, 11:
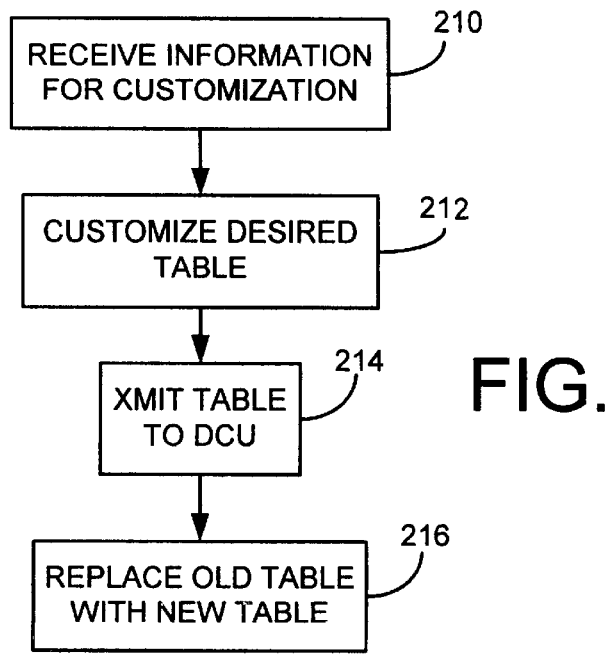
FIG. 7 is a flow diagram illustrating operation of the user interface in accordance with one embodiment of the present invention.
FIG. 11 illustrates a data structure including information used in communication between a computer and the diagnostic and control unit in accordance with one embodiment of the present invention.

As discussed above, any of the parameters stored in memory 43 can be modified by a technician through computer 53 and DCU 50. FIG. 7 is a flow diagram illustrating the operation of computer 53 in making such a change.

First, computer 53 receives information indicating that the parameters must be customized or modified. This is indicated by block 210. The information can be obtained from a customer or from other sources. For example, where a customer indicates that machine 10 is operating in a certain temperature environment, it may be desirable to change some operating parameters to accommodate for that environment. Similarly, the operator or technician may simply observe operation of power machine 10 and notice that certain potentiometer values have drifted, etc. In either case, information is received that certain table or database parameters need to be customized or changed. The technician then creates a new table containing the customized or modified values. This is indicated by block 212.

The new table or database is then transmitted to DCU 50 for loading into memory 43. This is indicated by block 214. Transmission of the new table can be performed in a wide variety of ways. For example, where a computer 53 is connected to DCU 50, and where computer 53 is connected into a network, such as the Internet, the technician can simply send the new table by electronic mail over the network. Similarly, where computer 53 is configured for wireless reception, the user can transmit the information by a wireless medium. Of course, the user can also transmit the new table by a direct dial-up modem, or by a floppy disk, or any other suitable and desired means.

Once DCU 50 has received the new table, the old table in machine 10 is replaced with the new table simply by communication between DCU 50 and controller 52. This is indicated by block 216.

Figure 8A:
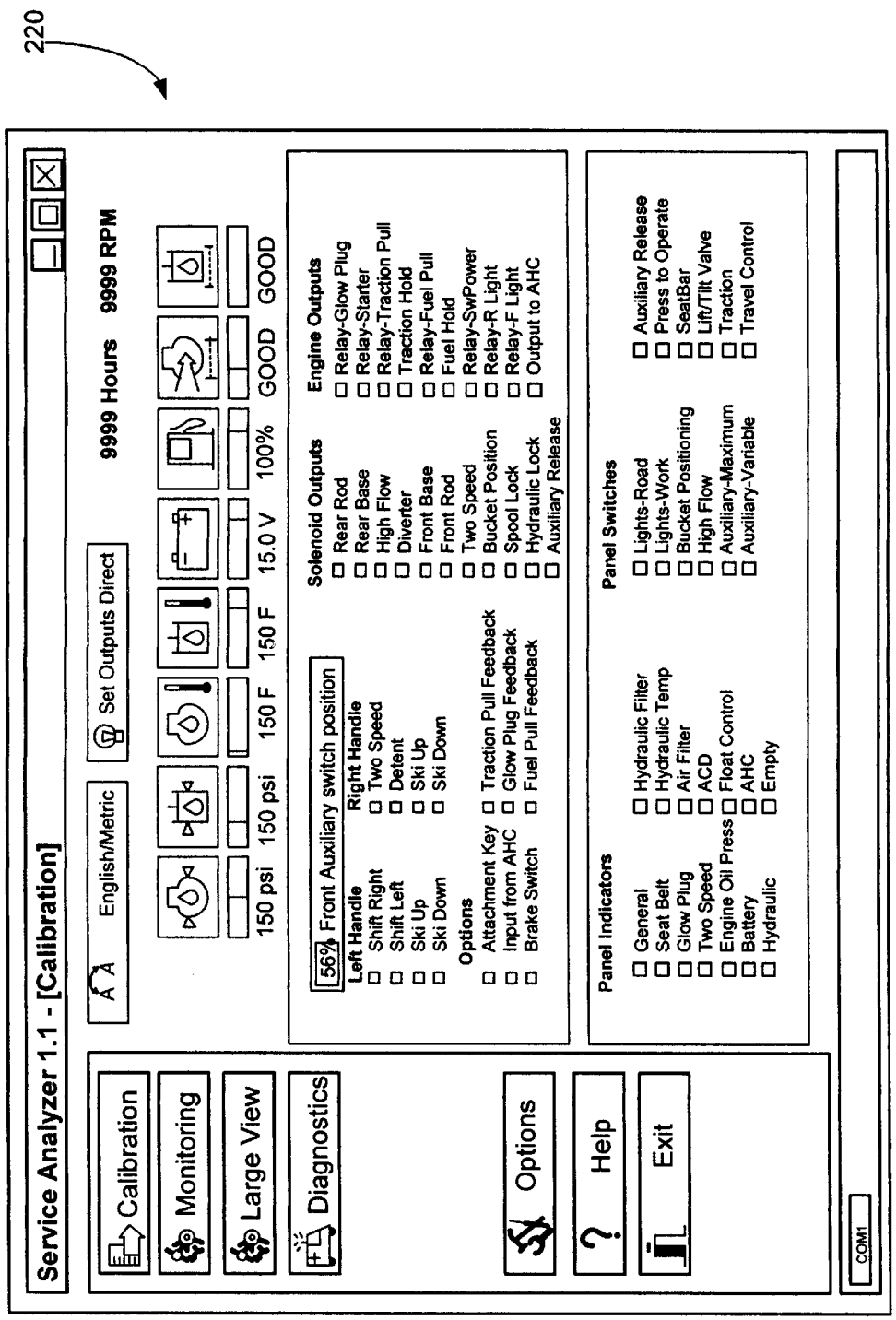
FIGS. 8A and 8B show user interfaces illustrating monitoring through a diagnostic and control unit in accordance with embodiments of the present invention.

FIG. 8A is an illustration of another user interface 220 on computer 23, in accordance with one embodiment of the present invention. Again, it should be noted that user interface 220 can be provided on a display on DCU 50. The discussion proceeds with respect to the display being provided at computer 53 by way of example only. It can be seen from the top of user interface 220 that the user has selected the options bar and the advanced monitoring function. User interface 220 illustrates that the technician utilizing computer 53 can monitor substantially every input and output of control circuit 51.

On the upper portion of the user interface 220, a plurality of virtual gauges are shown which illustrate internal engine oil pressure, hydraulic charge pressure, engine temperature, hydraulic fluid temperature, system voltage, fuel level, the status of the air filter, and the status of the hydraulic filter. On the lower portion of user interface 220, a plurality of features are shown adjacent grey squares and adjacent white squares. The white squares illustrate outputs while the grey squares are adjacent inputs to the controller. The user can actuate the handles within the operator inputs within cab 16 and watch to determine whether the appropriate solenoids or engine outputs have fired. In other words, the user can move the left handle to the shift left position. In that instance, the diverter and front base solenoid outputs should be activated (under certain circumstances). Therefore, the user can actuate the left handle to the shift left position and watch user interface 220 to determine whether the operation has proceeded correctly. If not, the user can attempt to correct the problem.

Similarly, as illustrated in FIG. 8A, user interface 220 provides a "Set Outputs Direct" input button. When this is selected by the user, it allows the user to set the outputs on the user interface 220 using a point and click device. In other words, instead of actually entering cab 16 and moving the left handle to the shift left position, the user can simply select the shift left box under the left handle column on user interface 220 using a point and click device. That will have the same effect as if the user had actually been in the cab and moved the left handle to the shift left position. DCU controller 55 simply sends an appropriate signal to controller 52 indicating that this input has been selected. Therefore, the user can select an input using a point and click device, and observe on user interface 220 whether the appropriate output solenoid has fired.

The solenoids illustratively are provided with a feedback line to controller 52 such that controller 52 can determine whether the solenoids or other outputs have fired. This is described in greater detail in the above-referenced applications. Briefly, a feedback line is provided from one end of a switch which reacts to the energization of a solenoid. Based on the signal level on the feedback line, controller 52 can determine whether the solenoid has fired.

The panel indicators on user interface 220 mimic panel lights or indications on a display panel in cab 16. Therefore, the user can determine whether appropriate panel indicators have come on. Similarly, the panel switches on user interface 220 mimic switches on the display or control panel within cab 16. This allows the technician a great deal of flexibility. The technician can exercise substantially every feature of loader 10 without ever entering cab 16. The technician can also, simply by viewing user interface 220, determine whether the appropriate outputs have been energized on loader 10, without ever approaching loader 10 other than to establish communication with controller 52.

Figure 8B:
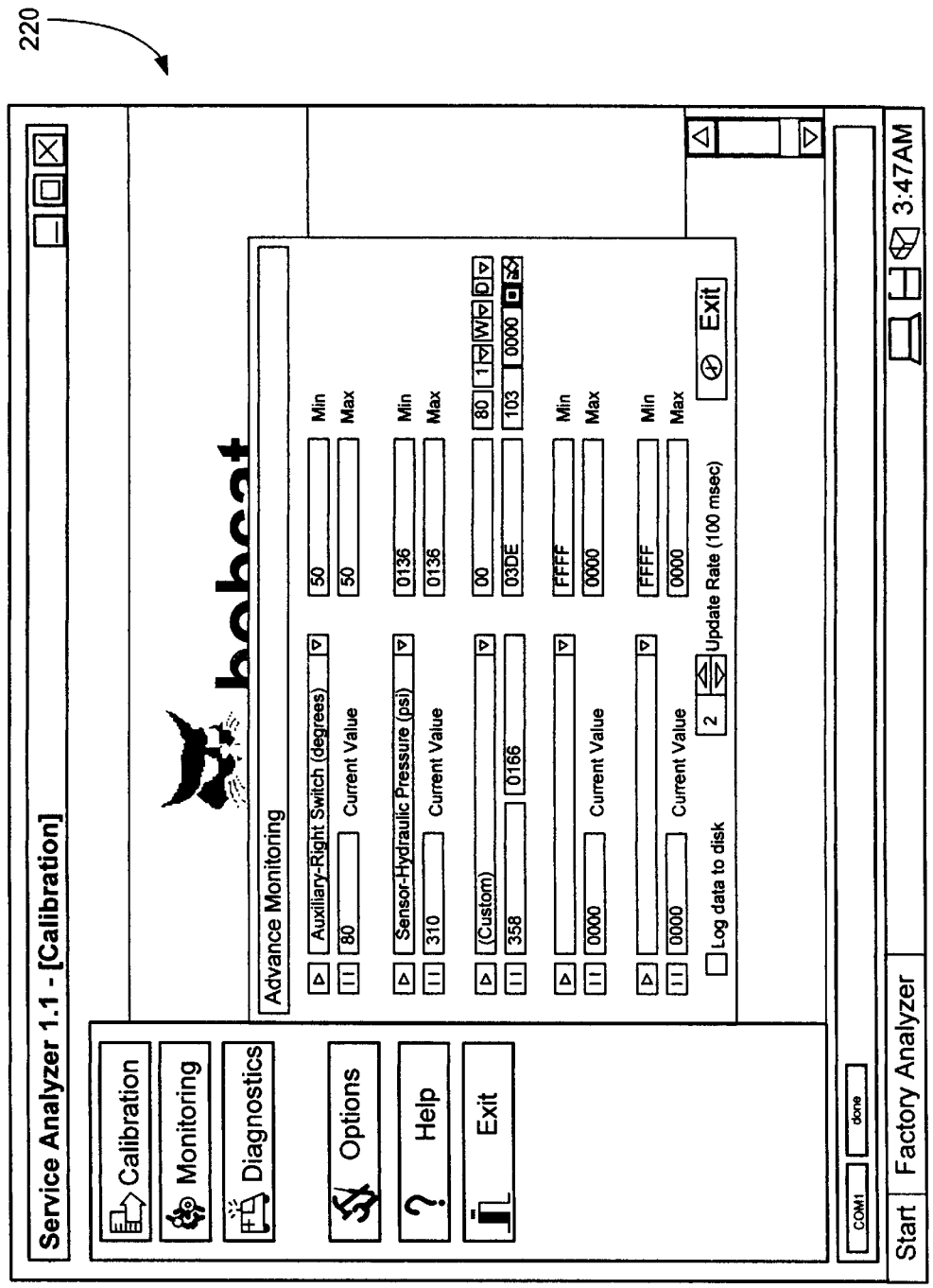

FIG. 8B shows another embodiment of user interface 220. The options button the left of the screen has been selected and advanced monitoring has also been selected. the display shows a wide variety of diameters displayed in drop down boxes. The parameters can be changed simply by writing over the current value or deleting and writing a new parameter. Similarly, the "Set Outputs Direct" function described with respect to FIG. 8A can also be performed. The user can write to substantially any memory location in controller 52 or memory 43 through this interface, thus actuating outputs of controller 52. The user can then simply monitor values stored in corresponding other memory locations (those which contain the results of the feedback signals from solenoids on loader 10) to see if the solenoid actually fired. Requiring the user to write to a specific memory location helps to preserve the integrity of the system.

Figure 9:
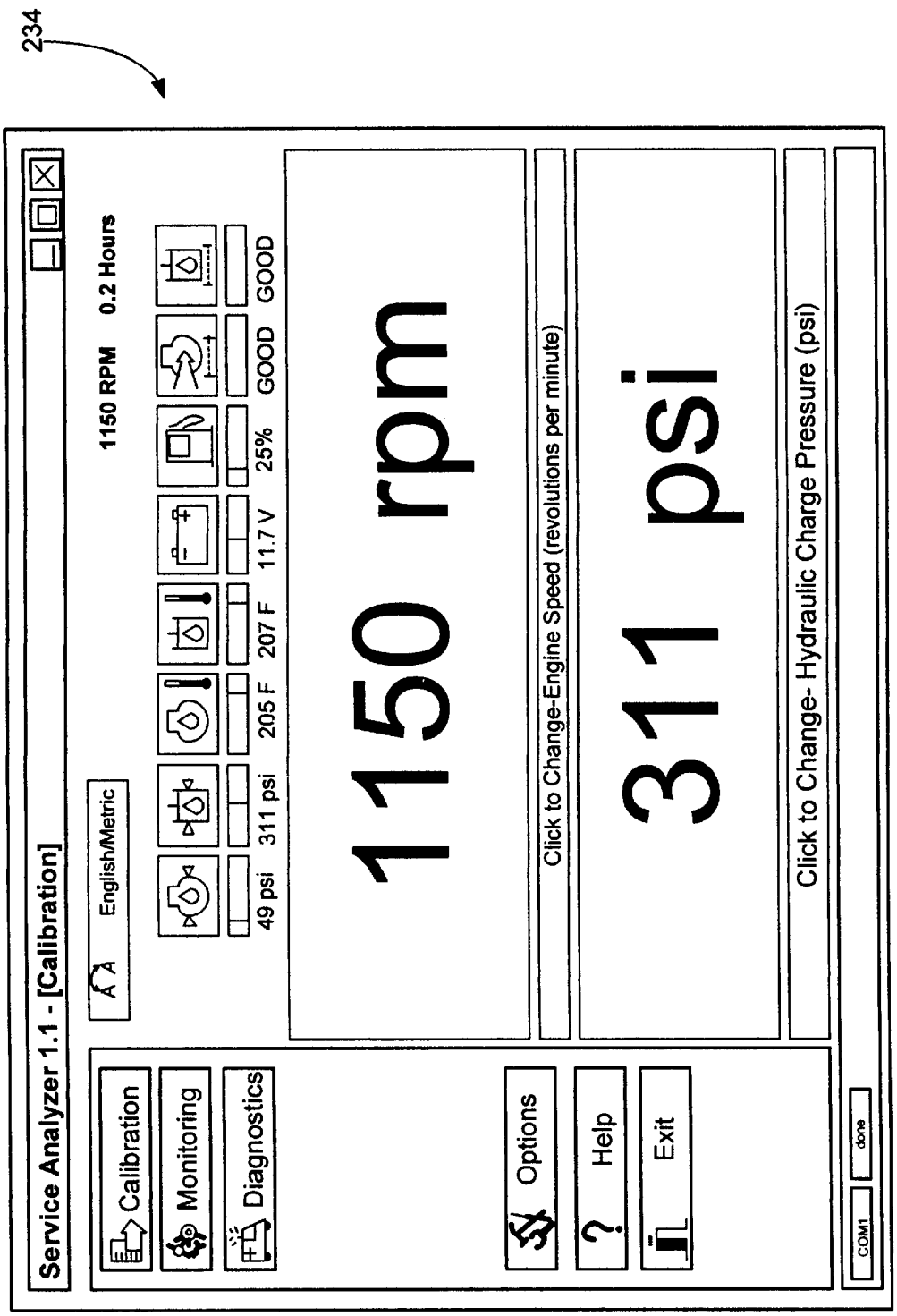
FIG. 9 shows a user interface illustrating an enlarged display in accordance with one embodiment of the present invention.

FIG. 9 illustrates yet another user interface 224 in accordance with one embodiment of the present invention. User interface 224 illustrates the display on the computer 53 (or DCU 50) when the user has selected a large view function using a point and click device. The large view illustrated in user interface 224 simply shows that two (or another desired number) of functions are displayed in extremely large format. In the embodiment illustrated in FIG. 9, the engine speed (which is located in the upper right hand corner of user interface 220) and the hydraulic charge pressure, are shown in extremely large text. Thus, the user can monitor these features from a distance. Therefore, the user can perform certain operations on loader 10, by approaching loader 10 and physically manipulating portions of loader 10, and still view the desired display elements. User interface 224 also indicates that a change display button is provided. When actuated, this button allows the user to select another parameter for large display. This allows the user to change the parameters which are displayed in the large textual format to substantially any desired parameters.

Figure 10:
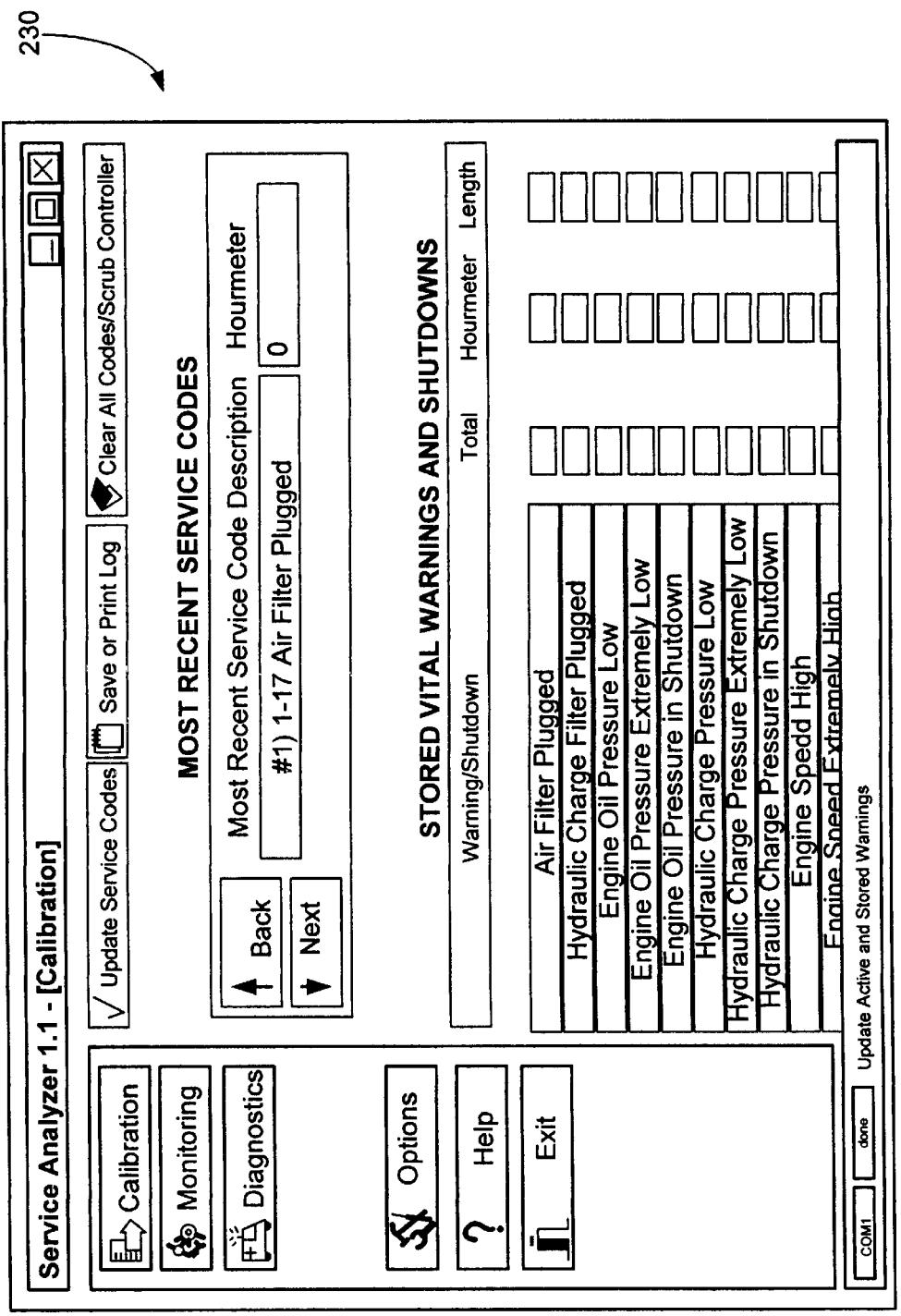
FIG. 10 shows a user interface illustrating the display of warnings and recent diagnostic codes in accordance with one embodiment of the present invention.

FIG. 10 illustrates yet another user interface 230 in accordance with another embodiment of the present invention. User interface 230 is one illustrative embodiment of a display and interface provided to the user when the user has selected the diagnostics function. User interface 230 is divided into substantially two sections including most recent warnings or diagnostics codes and stored events of virtual warnings and shutdowns. The most recent diagnostics codes section is found in the upper portion of user interface 230. Such codes are described in greater detail in the above-referenced co-pending U.S. patent applications. Briefly, the diagnostics codes indicate the most recent warning conditions which are related to undesirable operation or performance of certain aspects of loader 10. Such codes can identify low charge pressure, low fuel level or system voltage, and plugged air filter as examples. The numeric diagnostics codes are similar, but indicate the warning condition using a predefined numeric or alpha-numeric code.

It will be noted that FIG. 10 illustrates that user interface 230 provides a convenient mechanism for viewing the most recent diagnostics codes. Simply by selecting the "next" and "back" function keys, the user can navigate or scroll through the diagnostics codes. The user interface 230 provides a textual indication of the particular diagnostic code (such as "Air Filter Plugged") and the hour meter reading at which the warning became active. In this way, the user can view the various diagnostics codes and determine a sequence of events (i.e., the temporal sequence in which the warnings occurred).

The lower portion of user interface 230 shows stored events of vital warnings and shutdowns. This portion of user interface is divided into columns which provide a textual indication of the particular vital warning or shutdown condition being displayed, the total number of this particular type of warning or shutdown or failure which has occurred, the hour meter reading at which the event last occurred, and how long it lasted (in terms of elapsed hour meter time). A relatively short list of stored events of diagnostics codes and shut down conditions are illustrated in user interface 230 as examples. However, it will be appreciated that additional or fewer events and vital warning conditions can be monitored and displayed as well. Once the stored events of vital warnings and shut downs, and diagnostic codes have been viewed by the technician, they can be cleared out by DCU 50 (or computer 53 through DCU 50) providing a suitable code to controller 52.

FIG. 11 shows one illustrative data structure which is used in communicating between computer 53 and DCU controller 55. Data structure 240 includes a command field 242, a module ID field 244, data length field 246, data field 248 and checksum field 250. Data structure 240 is a variable length data structure and is the same whether the message originates from DCU controller 55 or computer 53.

Command field 242 illustratively includes one byte of information which indicates the particular command being made. This illustratively tells the receiving component (DCU controller 55 or computer 53) what to do with the message it is receiving. Such commands include, for example, a command for programming a module, obtaining data, writing data, and obtaining specific hour meter readings, serial number readings, program version levels, and internal data.

Module ID field 244 specifies the data structure's destination module. Modules can include, for example, controller 52, display devices 60, attachment control devices, computer 53, DCU controller 55, and any other module for which programming is desired.

The data length field 246 specifies how many data bytes are in the data field of data structure 240. Data field 248 contains the payload or data for the specific message of data structure 240.

Checksum field 250 is used for error detection and includes a checksum performed on the entire data structure. In one illustrative embodiment, the value contained in checksum field 250 is calculated such that the sum of all bytes in the message, including the check sum value in field 250, equals zero.

Any desired number of commands can be implemented. For example, a ping command can be used to verify that DCU 50 is attached to computer 53 with a simple call and response. The ping command is simply issued by computer 53 and requests DCU 50 to return a message indicating that it is connected.

A program module command allows a particular programming protocol to be requested, allows a module to request programming of itself, and allows information to be deleted and programmed, Of course, other commands can be implemented as well.

It can thus be seen that the present invention provides a diagnostic and control unit which can be utilized by a technician to perform some or all of the functions described above. The unit not only allows the technician to monitor certain features of a power machine, but to unlock a wide variety of those features and observe whether appropriate outputs have been energized. The present invention also provides the operator with a detailed monitoring and diagnostic capability for viewing failures and a wide variety of data surrounding failures. Further, the present invention allows an enlarged viewing screen, and provides for messaging between itself and an external computer (such as a personal computer). The tool is thus highly versatile and can increase efficiency in both maintaining power machines and in upgrading or changing software or parameters in the power machines.

Although the present invention has been described with reference to preferred embodiments, workers skilled in the art will recognize that changes may be made in form and detail without departing from the spirit and scope of the invention as reflected in the appended claims.

What is claimed is:

1. A method of changing operational characteristics of a power machine having an electronic machine controller and machine memory storing information accessible by the machine controller, the method comprising:

provided a remote controller, remote from the machine controller;

coupling the remote controller to the machine controller;

operating at least one hydraulic mechanical function of the power machine using the remote controller; and loading new information into the machine memory from the remote controller.

2. The method of claim 1 wherein loading new information comprises:

establishing communication between the remote controller and the machine controller;

determining whether the information in the machine memory is to be modified; and if so, automatically modifying the information in the machine memory with the new information.

3. The method of claim 1 wherein loading new information comprises:

obtaining a predefined new information set based on previous operation of the power machine; and loading the predefined new information set into the machine memory from the remote controller.

4. The method of claim 1 and further comprising:

performing diagnostic operations on the power machine with the remote controller; and wherein loading comprises obtaining the new information based on the diagnostic operations and loading the new information into the machine memory through the remote controller.

5. The method of claim 1 and further comprising:

retrieving and displaying current information; and providing a user selectable display element corresponding to an operational characteristic and which, when selected by the user, configures the remote controller to accept a new information value from the user.

6. The method of claim 1 wherein loading new information comprises:

loading a new software algorithm into the machine memory.

7. The method of claim 1 wherein loading new information comprises:

loading a new operational parameter into the machine memory.

8. The method of claim 1 wherein coupling comprises:

establishing a wireless connection between the remote controller and the machine controller.

9. The method of claim 1 wherein loading new information comprises:

transferring the new information from a floppy disc accessible by the remote controller to the machine memory.

10. A method of monitoring operation of a power machine having a machine controller, controlling certain functions on the power machine, and machine memory storing information accessible by the machine controller, the method comprising:

providing a remote controller, remote from the machine controller;

coupling the remote controller to the machine controller;

providing a signal to the machine controller from the remote controller to unlock a hydraulic mechanical function of the power machine;

exercising the hydraulic mechanical function; and monitoring operation of the hydraulic mechanical function.

11. The method of claim 10 wherein the hydraulic mechanical function is lockable by a hydraulic lock valve, and wherein providing a signal comprises:

providing an unlock signal to the machine controller, the machine controller controlling the hydraulic lock valve to unlock the hydraulic mechanical function based on the unlock signal.

12. The method of claim 10 wherein the remote controller includes a display device and wherein monitoring comprises:

displaying information indicative of operation of the hydraulic mechanical function on the display device.

13. The method of claim 12 and further comprising:

providing an actuation signal from the remote controller to the machine controller, the actuation signal being indicative of a requested actuation; and displaying information indicative of the actuation signal and indicative of a status of the requested actuation on the display device.

14. The method of claim 13 wherein providing an actuation signal comprises:

displaying user selectable display elements, each being indicative of a requested actuation; and providing the actuation signal based on user selection of an associated one of the user selectable display elements.

15. A method of monitoring operational characteristics of a power machine having a machine controller and a machine memory, the machine controller controlling operation of certain functions of the power machine, the method comprising:

providing a remote controller, remote from the machine controller, with an associated display device;

coupling the remote controller to the machine controller;

operating at least one hydraulic mechanical function of the power machine using the remote controller;

retrieving information from the machine memory indicative of the operational characteristics of the power machine; and displaying information indicative of the retrieved operational characteristics.

16. The method of claim 15 wherein the operational characteristics include current operating parameters stored in the machine memory and wherein displaying comprises displaying the current operating parameters.

17. The method of claim 15 wherein the operational characteristics comprise a plurality of most recent service conditions detected, the service conditions being indicative of detected conditions for which service is to be performed, and wherein displaying comprises:

displaying the plurality of most recent service conditions.

18. The method of claim 17 wherein displaying the plurality of most recent service conditions comprises:

displaying the plurality of most recent service conditions in a user navigable list.

19. The method of claim 18 wherein the power machine includes an operation clock which indicates an elapsed time of machine operation, and further comprising:

displaying an elapsed time at which each of the most recent service conditions occurred, along with its associated service condition, in the user navigable list.

20. The method of claim 18 wherein the power machine includes an apparition clock which indicates an elapsed time of machine operation and wherein displaying warning information includes:

displaying an indication of a warning condition, an elapsed time at which the warning condition occurred, and a duration of the warning condition.

21. The method of claim 20 wherein displaying an indication of a warning condition comprises:

displaying a number of times that the warning conditions occurred.

22. The method of claim 15 wherein displaying comprises:

displaying information indicative of options currently installed on the power machine.

23. A service tool system for use in servicing a power machine having a machine controller controlling certain operations of the power machine, the system comprising:

a remote start controller, remote from the machine controller and having a machine controller interface configured to be coupled to the machine controller;

a user input mechanism, coupled to the remote start controller, and configured to receive a user input and provide an input signal to the remote start controller, the remote start controller configured to provide a remote start signal to the machine controller interface based on the input signal; and a diagnostic controller interface coupled to the remote start controller and configured to be coupled to a diagnostic controller and further configured to provide a communicative interface through which operational characteristics of the power machine can be monitored and changed.

24. The service tool system of claim 23 and further comprising:

a diagnostic controller coupled to the diagnostic controller interface.

25. The service tool system of claim 24 and further including a display device coupled to the diagnostic controller and wherein the diagnostic controller is configured to display operational characteristics of the power machine to which the remote start controller is coupled.

26. The service tool system of claim 24 wherein the diagnostic controller is configured to provide information to the machine controller through the diagnostic controller interface, to modify operation of the power machine.

27. The service tool system of claim 26 wherein the diagnostic controller is configured to provide information to the machine controller to enable the machine controller to control the power machine to operate a predetermined attachment.

28. The service tool system of claim 26 wherein the diagnostic controller is configured to provide information to the machine controller to automatically modify controll algorithms used by the machine controller.

29. The service tool system of claim 26 wherein the dagnostic controller is configured to provide information to the machine controller to modify operational parameters used by the machine controller.

30. The service tool system of claim 23 wherein the user input mechanism includes unlock inputs configured to provide, when select by the user, an unlock signal to the remote start controller, the remote start controller providing a function unlock signal on the machine controller interface, base on the unlock signal, to unlock an associated function on the power machine.

* * * * *